United States Patent [19]

Greene

[11] 4,289,348

[45] Sep. 15, 1981

[54] VAN TOP CONVERSION AND BOAT COMBINATION

[76] Inventor: William C. Greene, 16005 114th Ave., SE., Renton, Wash. 98055

[21] Appl. No.: 76,667

[22] Filed: Sep. 18, 1979

[51] Int. Cl.³ .............................................. B60D 3/10
[52] U.S. Cl. ......................................... 296/157; 9/1.1
[58] Field of Search .................... 296/157; 280/414 R; 9/1.1

[56] References Cited

U.S. PATENT DOCUMENTS

| | | | |
|---|---|---|---|
| 2,598,458 | 5/1952 | Somers | 296/157 |
| 3,473,839 | 10/1969 | Elble | 296/157 |
| 4,036,520 | 7/1977 | Zuidema | 296/157 |

Primary Examiner—Joseph F. Peters, Jr.
Assistant Examiner—John A. Carroll
Attorney, Agent, or Firm—LeBlanc, Nolan, Shur & Nies

[57] ABSTRACT

A van top conversion or "bubble" top in combination with a boat symmetrically fitted thereover. A handle has a roller assembly on the bow of the boat cooperating with a groove formed exteriorally along the centerline of the top conversion to permit single handed removal of the boat from the top and replacement thereon after use. Oarlock mountings on the boat gunnels and the bow handle have complementary fittings on the top to secure the boat for road travel. The boat is formed with tubular stiffeners for structural integrity and flotation and is equipped with a pair of snap fit, removal seats having additional flotation.

6 Claims, 9 Drawing Figures

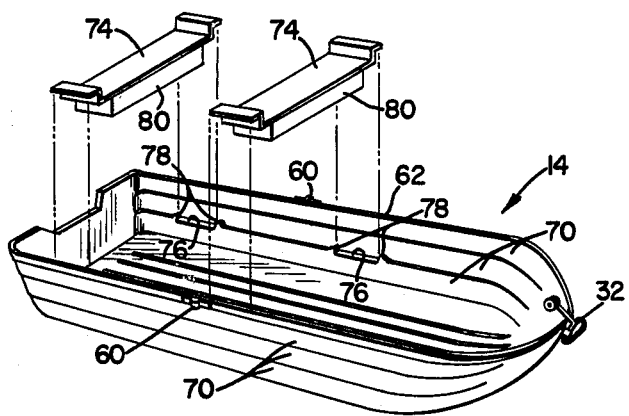
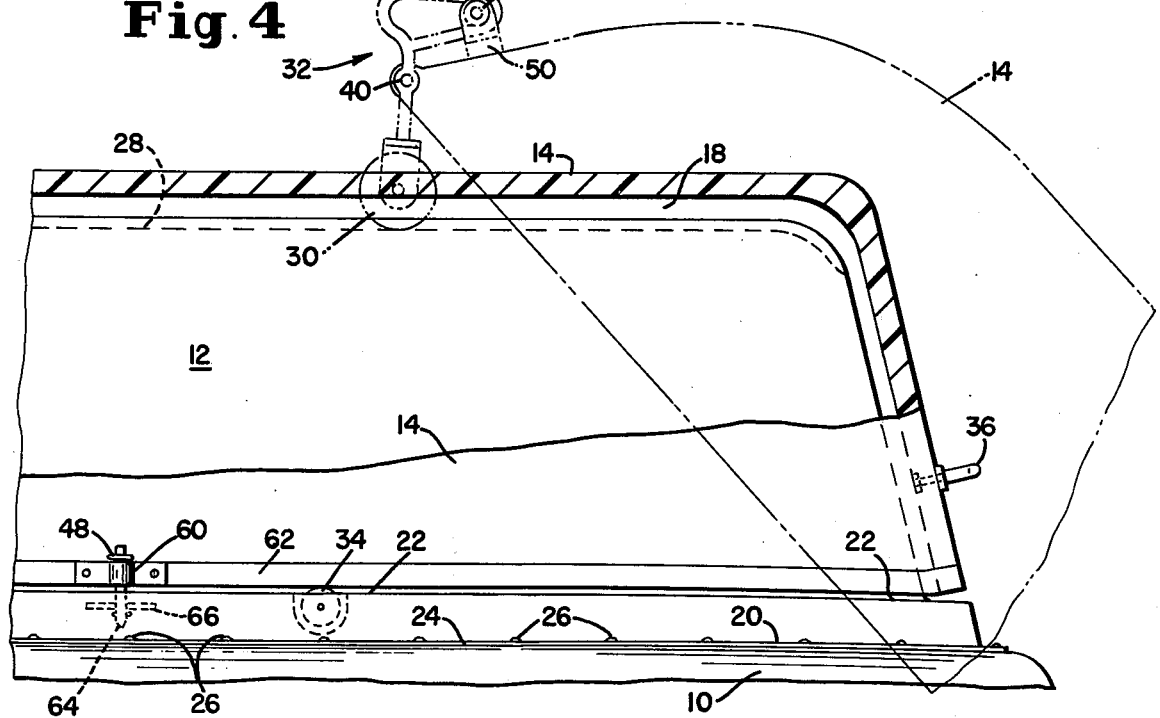
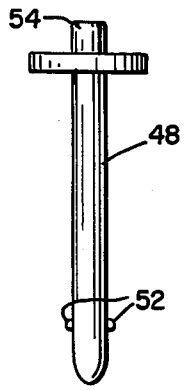
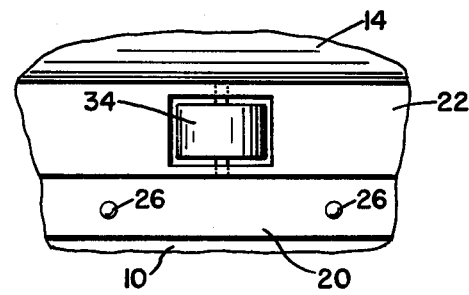

VAN TOP CONVERSION AND BOAT COMBINATION

BACKGROUND OF THE INVENTION

The invention relates generally to vehicle modifications and more particularly to a top conversion and boat combination assembly for a van, trailer or similar vehicle. Vehicles intended for recreational purposes are conventionally equipped with a trailer hitch and trailer upon which a boat is mounted and towed to a lake, bay or the ocean and then launched into the water. Such a configuration is both difficult to drive and potentially dangerous, particularly at speeds of 55 mph or greater. Boat trailers are usually flimsy structures which bounce at driving speeds. Accidental boat loss during travel is not uncommon. Once at the waterfront, the vacationer usually must wait an hour or two before being able to use the local boat ramp to launch his boat. Thereafter the vehicle and trailer must be parked elsewhere before the boat may be used. Before and after the trip, the vehicle and trailer must be attached together and separated, respectively. The nuisance of dealing with the trailer ball and hitch, brake and turn signal light connections, safety chain hookup and expense of fender mounted rear view mirrors makes the whole experience a less than desirable one.

Proposals have been advanced to mount a small boat directly on top of a vehicle by means of a supporting rack structure on the vehicle roof to thus dispense with the need for a trailer. However, as in the case of trailers, such structures tend to be rather flimsy and thus unsatisfactory. Additionally, the aerodynamics of such a combination, particularly at high speed road travel, are undesirable.

The prior, patented art includes several teachings of a vehicle-boat combination, none of which appear to have been met with acceptance in the market place. U.S. Pat. No. 2,598,458 discloses a trailer with a boat mounted on the top thereof, including a rail along the trailer top centerline and a grooved roller on the boat bow to assist placement of the boat on and removal from the trailer roof. However, the combination as taught appears incapable of single handed operation. Other teachings of vehicle roof and boat combinations are found in U.S. Pat. Nos. 2,310,431 and 3,324,487. Prior art teachings of the boat serving as the vehicle roof when the boat is not used are found in U.S. Pat. Nos. 1,455,994; 3,473,839; 3,955,731; 3,933,112; and 4,036,520.

What is not taught by the prior art is a vehicle top and boat combination as herein disclosed and claimed, including a groove formed in the vehicle top and a cooperating handle and roller assembly on the bow of the boat, the roller assembly and groove arranged so that the boat may be removed from and replaced on the vehicle top by one person. The boat is formed to fit symmetrically over the top to form a dead air, insulating space therebetween and both boat and top are designed for maximum aerodynamic efficiency.

SUMMARY OF THE INVENTION

Accordingly, it is a principal object of the invention to provide a vehicle top and boat combination, such as a van top conversion with a mating, symmetrical boat thereon, which may be easily removed from and replaced on the top by a single person.

It is another object of the invention to provide a vehicle top and boat combination including a groove formed along the centerline of the top and a handle with a pair of rollers adapted to ride in the vehicle top groove to facilitate boat loading and removal.

It is a further object of the invention to provide a vehicle top and boat combination which may be locked easily and securely to the top for road travel and security when not attended.

Yet another object of the invention is to provide a vehicle top and boat combination which is readily adapted for installation on any conventional van type of vehicle.

Yet a further object of the invention is to provide a vehicle top and boat combination which are symmetrically formed to provide a dead air, insulating space therebetween when in assembly, the external configuration of the boat assuring maximum aerodynamic efficiency.

It is still another object of the invention to provide a vehicle top and boat combination, the boat being formed with elongate tubular stiffeners therein for added strength and flotation as well as to facilitate launching from a shoreline into the water by merely sliding the boat along to the water, the boat further having a pair or snap-fit removable seats which are each provided with additional flotation.

It is still a further object of the invention to provide a vehicle top and boat combination wherein the boat is provided with a pair of transom mounted handles in addition to a bow mounted handle to thereby provide a convenient 3 point lift attachment for conventionally hoisting the boat into the water.

Still another object of the invention is to provide a vehicle top and boat combination of enhanced versatility, wherein the boat may be partially removed from the top and pole supported between the ground and the boat transom, thereby providing a convenient canopy for the vehicle when camping.

Generally, the vehicle top and boat combination disclosed herein includes a van top convension in the form of a "bubble top" and a symmetrical boat fitted over the top. In a preferred embodiment, the combination is marketed as a van top conversion kit called a "Bubble Boat". The roof of a conventional van is entirely removed or a portion may be left to serve as a storage shelf. The top "Bubble Top" is then installed onto the van. The top includes a groove or depression formed exteriorally along the centerline thereof. The boat has a swivel handle and roller assembly mounted on the bow thereof to facilitate loading and unloading of the boat. The top has a peripheral skirt formed about the base thereof so that, in assembly, the boat and top form a smooth, uninterrupted, aerodynamically stable structure. The boat gunnels are provided with oarlock mounts which further serve to latch the boat to the top. The swivel handle is also used to lock the boat to the van. The boat is of flat bottom, step chined configuration, made of molded fiberglass with a series of tubular, longitudinal stiffeners therein for increased strength and flotation. The boat may have a pair of transom mounted handles to assist loading and unloading of the boat from the van. A pair of flush mounted rollers are located on the peripheral skirt of the top, one on either side thereof, to further aid boat loading and unloading. A pair of snap-fit, removable seats with additional flotation are provided for the boat. A pair of poles may be used to support the boat from the rear of the top so that the boat becomes a convenient canopy.

BRIEF DESCRIPTION OF THE DRAWINGS

These and other objects of the invention will become readily apparent by reference to the following specification and drawings in which:

FIG. 3 is a perspective view of the boat and snap-fit seats for the boat;

FIG. 4 is a partial side elevation view of the invention, partly in section, illustrating loading and unloading of the boat;

FIG. 5 is an elevation view of a latch pin used to secure parts of the boat to the top;

FIG. 6 is a detail view of one flush mounted roller located along a side of the peripheral skirt of the top;

DESCRIPTION OF THE PREFERRED EMBODIMENT

Figure 1:
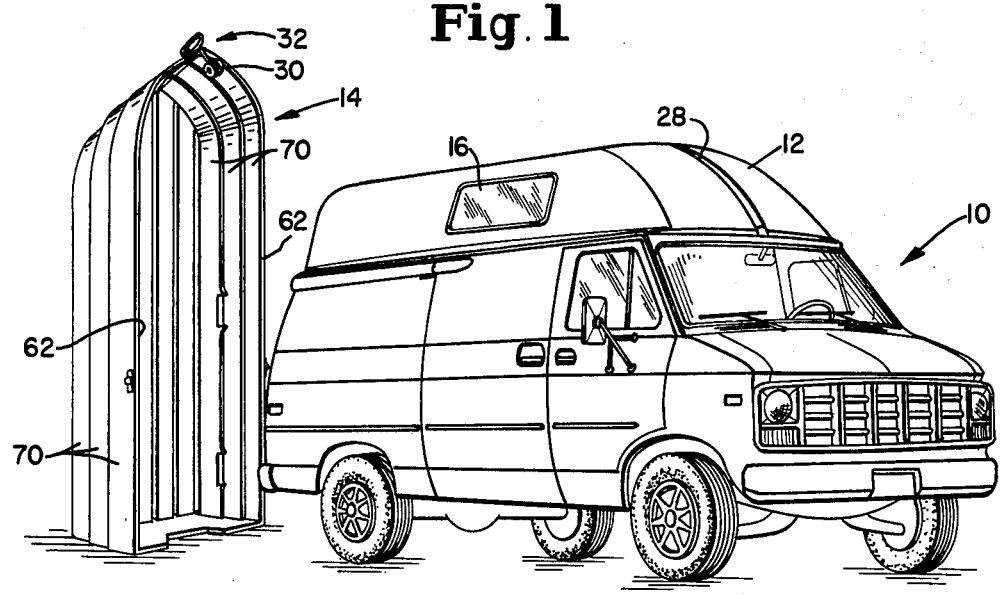
FIG. 1 is a perspective view of a preferred embodiment of the invention with the boat removed to reveal the van conversion top.
Figure 2:
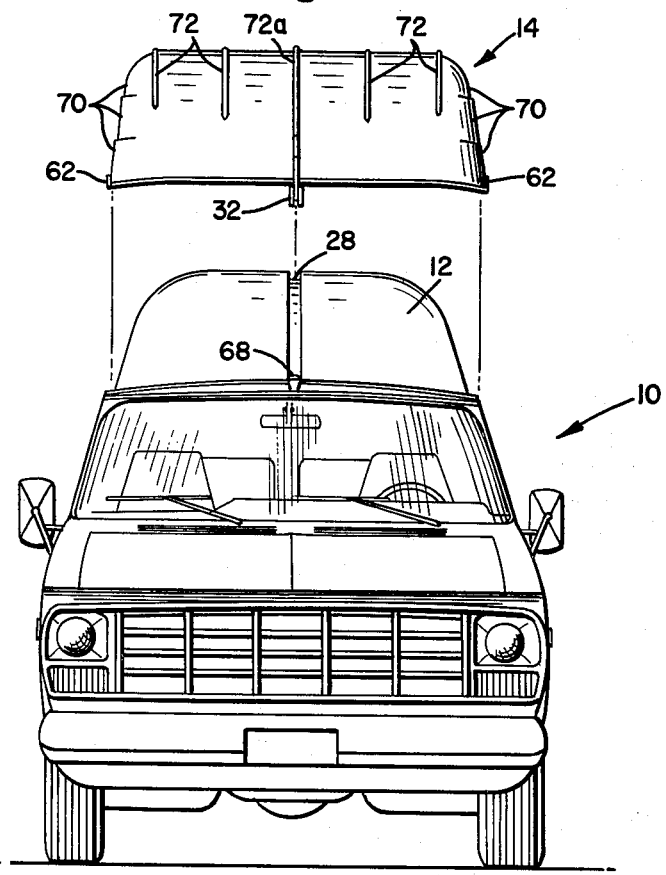
FIG. 2 is a front elevation view of the invention as shown in FIG. 1 with the boat elevated as indicated in phantom lines to reveal the van top therebeneath.

Referring now to the drawings by reference character, and in particular to FIGS. 1 and 2 thereof, a conventional van 10 is illustrated, equipped with the van top conversion and boat combination of this invention, including a bubble top 12 and a boat 14, shown removed from the van 10 in FIG. 1 to more clearly reveal top 12. One or more windows 16 may be provided in top 12 as desired. As can be seen in FIGS. 2 and 4, the exterior of top 12 and the interior of boat 14 are symmetrically formed to provide a dead air space 18 (FIG. 4) therebetween. When boat 14 is in place on top 12, dead air space 18 provides a significant amount of insulation for van 10 as well as some soundproofing.

Bubble top 12 may be readily installed on a conventional van 10 either professionally or by a "do-it-yourselfer" with some knowledge of tools. In the preferred embodiment, top 12 is molded of fiberglass with a heavy, reinforced fiberglass peripheral skirt or flange 20 thereabout (FIG. 6). A peripheral shelf 22 is molded into top 12, concentrically inwardly of skirt 20 and slightly thereabove. Shelf 22 is dimensioned so that boat 14 and top 12 present a smooth uninterrupted profile in assembly, as shown in FIG. 4.

Modification of van 10 to receive bubble top 12 and attachment of top 12 to the van are accomplished by a rather conventional procedure. First, the existing roof of van 10 is cut out to an appropriate sized opening. If desired, a portion of the van roof may be left (not shown) to serve as a storage shelf for parts of the boat or other equipment. An intermediate gasket 24 of desired thickness (FIGS. 4 and 7) is coated on both sides with a silicone sealer or the like to assure watertight integrity of top 12 with van 10. Gasket 24 is placed about the opening whereafter the top 12 is placed over the opening with flange 20 resting on gasket 24. Flange 20 is secured firmly by a number of pop rivets 26 evenly spaced about flange 20.

A significant feature of top 12 is the provision of a groove or depression 28 running the full length of top 12, along the centerline thereof. Groove 28 provides a guide track for the rollers 30 of a swivel handle and roller assembly 32 mounted on the bow of boat 14 during boat loading and unloading. Further assistance for the operation is provided by a pair of flush mounted rollers 34 mounted within shelf 22 (FIG. 6) towards the rear of top 12 and van 10 (FIG. 4), one roller on each lateral side of top 12. A pair of handles 36 (one of which is shown in FIG. 4) provide convenient hand grips for boat loading and unloading.

Figure 7:
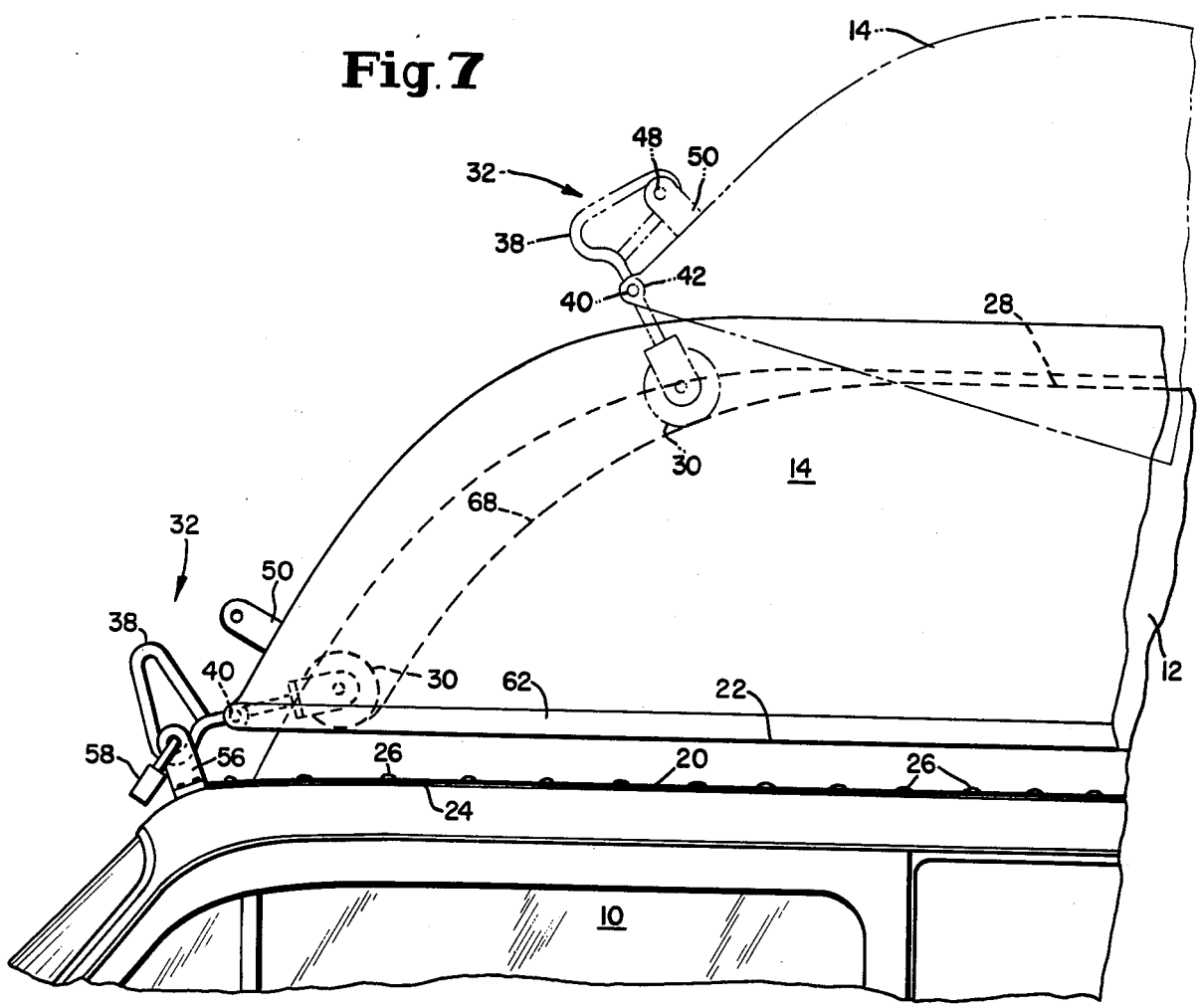
FIG. 7 is a view similar to FIG. 4 further illustrating loading and unloading of the boat from the top.
Figure 8:
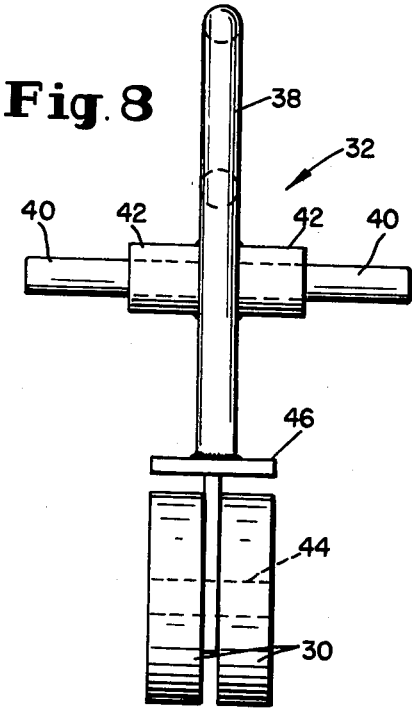
FIG. 8 is a front, elevation view of the swivel handle and roller assembly mounted on the bow of the boat.
Figure 9:
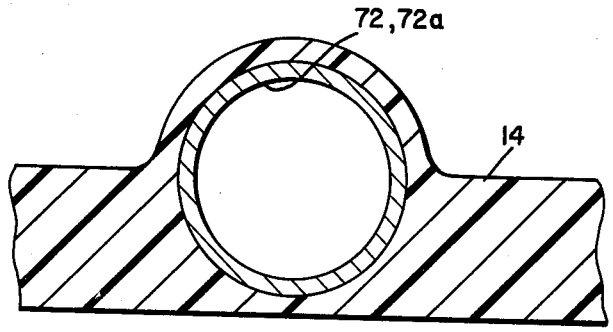
FIG. 9 is a detail, section view through a portion of the boat disclosing one of the tubular stiffeners molded therewithin.

In addition to rollers 30, swivel handle and roller assembly 32 includes a handle 38, an axle 40 with bushings 42 which are mounted within a notch formed in the bow of boat 14 (FIG. 7), a roller axle 44 for rollers 30 and a wheel strut and strut support 46 welded to the base of handle 38, all as shown in FIG. 8. As illustrated by phantom lines in FIG. 7, handle and roller assembly is locked in position for boat loading and unloading by a convenient snap pin 48 (FIG. 5) inserted through a bifurcated fitting 50 mounted on the bow of boat 14. Snap pin 48 is rather conventional in structure and includes ball snaps 52 which are retracted by depression of a push button 54.

As shown in full lines in FIG. 7, the bow of the boat may be securely locked to van 10 and top 12. With pin 48 removed, handle and roller assembly 32 is swiveled forwardly and downwardly so that handle 38 is located between the ears of a second bifurcated fitting 56 located on van 10. A padlock 58 engages handle 38 with fitting 56. Alternatively, the snap pin 48 may be used in place of padlock 48 if theft is not a worry. Similarly, padlock 58 may be used in place of pin 48 to locate handle and roller assembly 32 for loading and unloading of boat 14, as shown in phantom lines in FIGS. 4 and 7. If desired, pin 48 may be tethered to the bow of boat 14 by a short length of cord or brass link chain so that pin 48 will not be lost.

Further security of boat 14 on top 12 is assured by inserting additional snap pins 48 through oarlock mounts 60, on either side of boat rails 62 (FIGS. 3 and 4), into mating bores 64 formed in shelf 22 of top 12. Balls 52 of pin 48 engage a catch plate 66 molded within shelf 22 (FIG. 4).

Fittings 50 and 56, pins 48, handle 36, oarlock mounts 60 and appropriate components of handle and roller assembly 32 may be fabricated from stainless steel or other material having suitable strength and rust resistant properties.

As hereinbefore set forth, boat loading and unloading may be accomplished easily by one person and without need of any tools. First, pins 48 engaging oarlock mounts 60 with shelf 22 are removed by depressing button 54 of each pin 48 and lifting pin 48 out of its bore 64. Next, padlock 58 (or pin 48) is disengaged from handle 38 and fitting 56. Handle 38 is rotated upwardly and pin 48 (or padlock 58) is inserted through fitting 50 on boat 14 and handle 38. Then, handles 36 (FIG. 4) on the transom of boat 14 are grasped and pulled. Boat 14 moves easily upwardly and rearwardly as shown in phantom lines in FIG. 7. Additionally, the forward portion of groove 28 is gradually deepened towards its forward terminus, as shown at 68 in FIG. 7, not only to ease the boat unloading operation but also to provide room for rollers 30 when the boat is fully loaded, also as shown in FIG. 7. Also, flush mounted rollers 34 assist loading and unloading by providing a virtually friction free mounting of boat rails 62 on shelf 22 of top 12.

Boat 14 is pulled rearwardly with rollers 30 riding in groove 28. As the bow of boat 14 approaches the rear of top 12, the transom of the boat may be lowered to the ground and the boat stood upright as shown in FIG. 1. Boat 14 is then easily lowered to the ground. Reloading of the boat is accomplished by merely reversing the steps just outlined.

A preferred embodiment of the construction of boat 14 will now be discussed in detail. It is made of molded fiberglass employing techniques conventionally used with a few significant improvements. Of course, boat 14 is molded into the same general shape as its counterpart top 12. The boat design is a hard chine, flat bottom type with stepped gunnels or sides each being three in number as indicated at 70. The bow of the boat is spoon shaped not only to enhance stability when in water but also to create a streamlined laminar air flow thereby during road travel.

As is shown in FIG. 2, the bottom of the boat includes five, one-inch diameter aluminum tubing stiffeners 72 molded into the fiberglass; center stiffener 72a forms a keel for the boat. In the preferred embodiment, tubes 72 provide 1.6 cubic feet of trapped air space, thus increasing fresh water buoyancy by about 100 lbs. These five stiffeners 72 also facilitate sliding the boat over the ground and into the water after unloading from top 12.

A pair of removable seats 74 are provided, the ends of which are merely snap fit into molded in seat slots 76 having bights 78 to receive seats 74. Each seat 74 includes a block of flotation material 80 secured therebeneath for added flotation.

In a preferred embodiment, boat 14 is about 11 feet long, 5 feet wide and 1.5 feet deep. The boat alone weights but 130 lbs. and thus is easily handled by one person. The transom is sloped slightly (FIG. 4) for improved road travel aerodynamics. Color may be molded into both boat 14 and top 12 according to customer wishes. Both boat 14 and top 12 may be made in varying depths and heights, respectively, to suit customer preference.

Bow handle 38 and transom handles 36 also provide a convenient 3 point lift attachment for a three wire lift sling (not shown) when it is feasible to hoist the boat into the water. The boat may be used as a van canopy for camping and the like by merely partially unloading it from the van top and supporting the transom by simple poles equipped with snap hooks (not shown) engaging handles 36 in tripod fashion. Of course, handle 38 may be used to tie boat 14 to a dock piling or cleat (not shown).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A vehicle top conversion and boat combination comprising: a top adapted to be permanently installed on a vehicle in a closed, sealed relationship thereto; a boat arranged to be inverted and fitted onto said top in symmetrical relationship therewith; and means for facilitating the loading and unloading of said boat onto and from said top, said boat including a bottom, gunnels, a transom and a bow; said facilitating means comprising means defining a longitudinal, exterior groove along the centerline of said top, a handle and roller assembly pivotally mounted in said bow of said boat and pivotally movable between a first position, latched to a portion of said bow and a second position, latched adjacent said top, said assembly having rollers arranged to ride in said groove when said assembly is in said first position, whereby said boat may be unloaded from said top by grasping said transom and pulling said boat away from said top with said rollers riding in said groove, first latch yoke means mounted at the bow of said boat for releasable engagement with said handle and roller assembly and for retaining said handle and roller assembly in said first position, and second latch yoke means mounted adjacent said top for releasable engagement with said handle and roller assembly and for securing said boat in said second position.

2. The vehicle top conversion and boat combination as claimed in claim 1 wherein said top is provided with a peripheral shelf thereabout, said shelf being dimensioned to receive and support said boat about the upper periphery thereof when inverted.

3. The vehicle top conversion and boat combination as claimed in claim 1 wherein said boat includes a pair of oarlock mounting means on external sides of said gunnels and quick disconnect means engaging said oarlock mounting means with said top shelf, externally of said top, when said boat is inverted and fitted onto said top.

4. The vehicle top conversion and boat combination as claimed in claim 1 wherein quick disconnect means are provided to latch said handle and roller assembly in said first and second positions.

5. The vehicle top conversion and boat combination as claimed in claim 1 wherein said top shelf further comprises roller means mounted therein for facilitating loading and unloading of said boat onto and from said top.

6. The vehicle top conversion and boat combination as claimed in claim 1 wherein said boat is molded of plastics material and further comprises a plurality of hollow tubular stiffeners arranged longitudinally of said boat, generally parallel to one another, within said plastics material comprising said boat.

* * * * *